US012009851B2

(12) United States Patent
Riggs (10) Patent No.: US 12,009,851 B2
(45) Date of Patent: Jun. 11, 2024

(54) AFTERMARKET HEAD UNIT INSTALLATION KIT FOR USE WITH SALVAGED ORIGINAL EQUIPMENT MANUFACTURER (OEM) VEHICLE CONTROLS

(71) Applicant: AAMP of Florida, Inc., Clearwater, FL (US)

(72) Inventor: Brett D. Riggs, Yorba Linda, CA (US)

(73) Assignee: AAMP of Florida, Inc., Clearwater, FL (US)

( * ) Notice: Subject to any disclaimer, the term of this patent is extended or adjusted under 35 U.S.C. 154(b) by 411 days.

(21) Appl. No.: 17/069,550

(22) Filed: Oct. 13, 2020

(65) Prior Publication Data

US 2021/0028805 A1    Jan. 28, 2021

Related U.S. Application Data

(63) Continuation of application No. 15/663,781, filed on Jul. 30, 2017, now abandoned.

(60) Provisional application No. 62/370,337, filed on Aug. 3, 2016.

(51) Int. Cl.
*H04B 1/3822* (2015.01)
*B60R 11/02* (2006.01)
*G06F 3/0362* (2013.01)
*B60R 11/00* (2006.01)

(52) U.S. Cl.
CPC ........ *H04B 1/3822* (2013.01); *B60R 11/0205* (2013.01); *G06F 3/0362* (2013.01); *B60R 2011/0005* (2013.01)

(58) Field of Classification Search
CPC .......................... H04B 1/3822; B60R 11/0205
See application file for complete search history.

(56) References Cited

U.S. PATENT DOCUMENTS

D639,794 S   *   6/2011   Fiore, IV ..................... D14/258
2011/0061489 A1*   3/2011   Bulin ...................... G05G 1/12
                                                                74/553
2012/0318654 A1   12/2012   Harris et al.

OTHER PUBLICATIONS

American International Industries, Inc., GMK325 Mounting Kit (Year: 2013).*
MVI Inc., How to Upgrade a 2010-2014 Chevy Camaro to a Factory MyLink/Navigation System, YouTube, https://www.youtube.com/watch?v=vX_-rVEJZSk, Published Jan. 4, 2014 (Year: 2014).*

(Continued)

*Primary Examiner* — Kyle A Cook
(74) *Attorney, Agent, or Firm* — Michael Best & Friedrich LLP (57) ABSTRACT

A method of installing an aftermarket head unit for an aftermarket radio in a vehicle. The method includes removing an Original Equipment Manufacturer (OEM) autosound head unit from the vehicle, removing a plurality of OEM knob assemblies from the removed OEM head unit, installing in the vehicle an aftermarket head unit, wherein the aftermarket head unit includes a panel having a plurality of apertures for receiving and engaging the plurality of OEM knob assemblies, and installing each of the plurality of OEM knob assemblies in an individual one of the plurality of apertures of the aftermarket head unit.

18 Claims, 7 Drawing Sheets

(56) References Cited

OTHER PUBLICATIONS

Fitting replacement heater / AC control knobs how to Focus mk2 XR5 / ST225, OEM Denied Performance, YouTube, published on Mar. 31, 2016, available at https://www.youtube.com/watch?v=gZ_GcbajqP4 (Year: 2016).*
MVI Inc., "How to Upgrade a 2010-2014 Chevy Camaro to a Factory MyLink/Navigation System", YouTube, <https://www.youtube.com/watch?v=vx_-rVEJZSk>, published Jan. 4, 2014.
2010 Camaro, General Motors, 2009.
"American International" TOYK972/972S Mounting Kit—Kit Assembly Instructions.
"American International" GMK325BM Mounting Kit—Kit Assembly Instructions.

\* cited by examiner

AFTERMARKET HEAD UNIT INSTALLATION KIT FOR USE WITH SALVAGED ORIGINAL EQUIPMENT MANUFACTURER (OEM) VEHICLE CONTROLS

CROSS-REFERENCE TO RELATED APPLICATIONS

This application is a continuation of U.S. patent application Ser. No. 15/663,781, filed Jul. 30, 2017, which claims priority to U.S. Provisional Application No. 62/370,337, filed Aug. 3, 2016, the entire contents of each are incorporated by reference herein.

FIELD OF TECHNOLOGY

Aspects of the disclosure relate to kits for adapting an automobile for replacement of an Original Equipment Manufacturer (OEM) car stereo (referred to, in the alternative herein, as a "head unit") with an aftermarket car stereo or head unit.

The term "OEM head unit" may be understood herein to refer to electronic devices capable of playing audio and/or displaying video media, and includes, without limitation, each of the foregoing components either individually or in combination that are produced by the Original Equipment Manufacturer. The term "aftermarket head unit" may be understood herein to refer to electronic devices capable of playing audio and/or displaying video media, and includes, without limitation, each of the foregoing components either individually or in combination that are produced by an aftermarket manufacturer.

BACKGROUND

Standard equipment on most cars includes an AM/FM radio tuner, tape deck, and/or compact disk (CD) player. Digital media players (e.g., mp3 players, DVD players, minidisk players), CD changers, satellite radio tuners, navigation systems and computers may also be purchased for an automobile as OEM or aftermarket parts.

As more and different aftermarket head unit components become available, people want the flexibility to customize and/or upgrade their existing head unit equipment to take advantage of the new innovations in car audio equipment.

This flexibility may be limited by the fact that many new vehicles have an OEM head unit integrated with one or more user interfaces, such as head unit knobs or other similar user interface equipment. Upon removal of the OEM head units, the user interfaces need to be removed as well.

Typically, because of size mismatches between the OEM head unit and the aftermarket head unit, installation kits have been provided for enabling installation of aftermarket head units.

These kits have typically needed to provide such replacement interfaces because the OEM user interfaces were integrally related with the removed OEM head units. As such, one of the requirements of legacy kits was that the kits provide aftermarket head unit user interfaces to replace the removed OEM user interfaces that formed a part of the OEM head units.

Moreover, the OEM head units' interfaces have become more complex with time. As such, it has become more difficult to provide kits for use with aftermarket head units because of the level of complexity associated with the OEM user interfaces required to control the OEM head units.

As state above, often the user cannot remove the OEM head unit without replacing the OEM user interface mechanisms. In such circumstances, the replacement user interface mechanisms may be of a lesser quality and/or complexity than the OEM user interface mechanisms and, as such, reduce the quality of the user experience associated with the aftermarket head unit.

In addition, replacing, or substituting for, the highly complex OEM user interface mechanisms may sharply increase the complexity, and cost, of kits for use with replacement OEM head units.

For these and other reasons, there exists a need for partial installation kits that allow aftermarket head units to be installed in vehicles, while keeping the complexity of manufacturing such kits to a minimum.

There exists a further need for providing installation kits that salvage user interfaces associated with OEM head units in order to reduce the complexity of fabricating the installation kits.

SUMMARY

Apparatus and methods for an installation kit for an aftermarket head unit are provided.

An aftermarket autosound head unit installation kit may preferably enable installation of an aftermarket radio in a vehicle. The kit may include a panel.

The panel may include a plurality of apertures. The plurality of apertures may include a rectangular aperture having a roughly rectangular shape. The rectangular aperture may be configured for receiving and engaging a display associated with the aftermarket autosound head unit.

The plurality of apertures may also include two circular apertures. Each of the two circular apertures may include a roughly circular shape. Each of the two circular apertures may be configured for receiving and engaging one of two (or more) OEM knob assemblies.

The kit may further include a plurality of detent retainer seats. Each of the detent retainer seats may be configured to receive and engage an OEM detent retainer.

The kit may further include a circuit board. The circuit board may preferably replicate the portions of an OEM circuit board that relate to receiving signals from each of the OEM knob assemblies. Upon installation of the kit, the circuit board may preferably be operationally coupled to each of the OEM knob assemblies. The circuit board may be configured to send signals to the vehicle, either via a data bus, a hardwired connection or wirelessly, in response to rotation.

The circuit board may be configured to send signals to the vehicle, either via a data bus, a hardwired connection or wirelessly, in response to actuation of the knobs or actuation of a portion of the knobs.

A method according to some embodiments of installing an aftermarket radio in a vehicle may include removing an OEM autosound head unit from the vehicle. The method may also include removing a plurality of OEM knob assemblies from the face of the removed OEM head unit and removing a plurality of detent retainers from the removed OEM head unit. It should be noted that, in certain vehicles, OEM knob assemblies may include one or more buttons on the face of the knob, or on one or more other locations of the knob assembly. For the purpose of this application, the term "knob assemblies" refers to knob assemblies with or without buttons located thereon.

Following removal of the OEM knob assemblies and plurality of detent retainers, the method may further include installing in the vehicle an aftermarket autosound head unit installation kit. The kit may preferably enable installation of an aftermarket head unit in the vehicle. The aftermarket head unit installation kit may include a plurality of apertures for receiving and engaging the plurality of OEM knob assemblies and a plurality of detent retainer seats for receiving and engaging the plurality of detent retainers. The method may further include installing each of a plurality of OEM knob assemblies in an individual one of the plurality of apertures and/or installing each of the plurality of detent retainers in an individual one of the plurality of detent retainer seats.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1A:
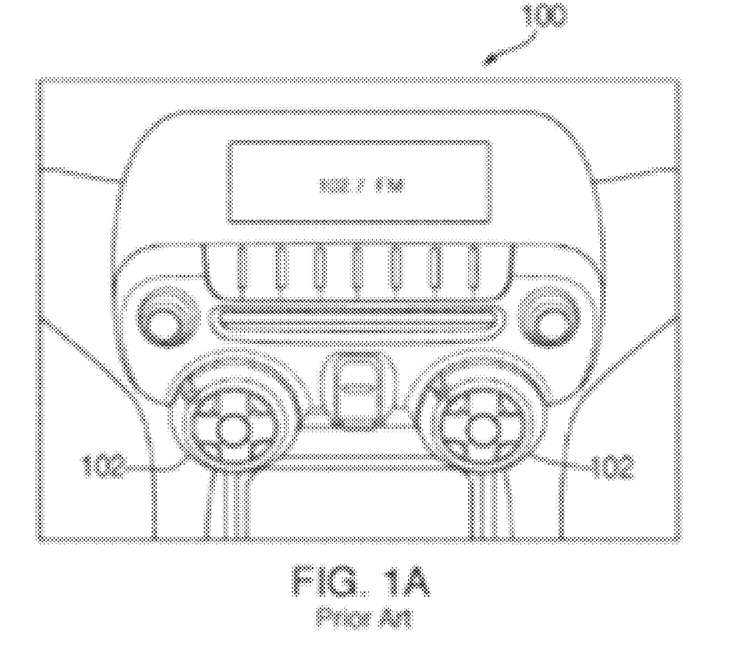
FIG. 1A shows a front view of a prior art OEM head unit.
Figure 1B:
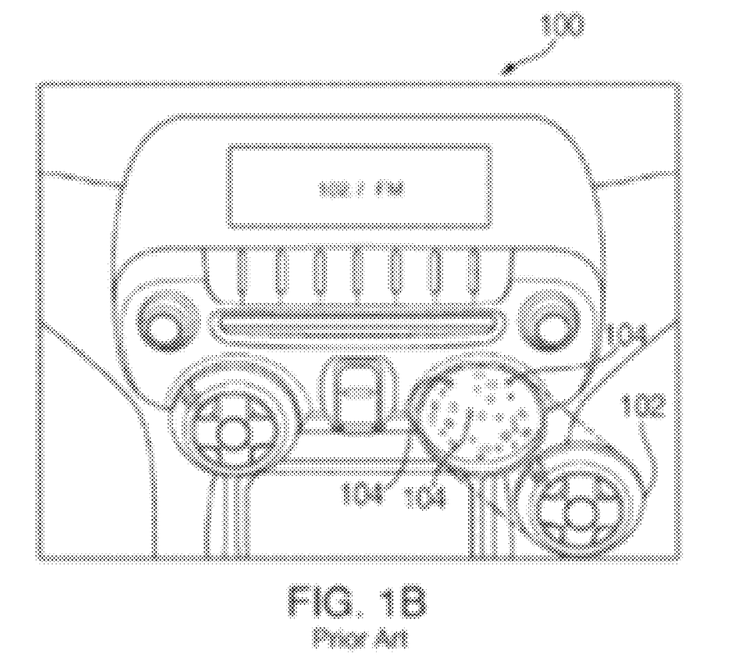
FIG. 1B shows a front view of the prior art OEM head unit with a knob assembly removed.

FIG. 1A shows a front view of a prior art, installed, OEM head unit 100 as may be installed on certain late-model Chevrolet Camaro™ automobiles. OEM head unit 100 may include one or more than one knob assembly 102. FIG. 1B shows a front view of the OEM head unit 100 with knob assembly 102 removed from the head unit. In typical OEM head units, knob assembly 102 may be removed from OEM head unit 100 by removing OEM head unit 100 from the dashboard of the vehicle and then unscrewing a plurality of screws (not shown in FIGS. 1A and 1B) which, when deployed, serve to fixedly attach knob assembly 102 to OEM head unit 100. The screws are installed (and removed) from the back of OEM head unit 100 and, therefore, would not be visible from the front view of OEM head unit 100. It should be noted, however, that screw holes 104 show exemplary holes into which screws may be inserted for attaching knob assemblies 102 to OEM head unit 100.

Figure 1C:
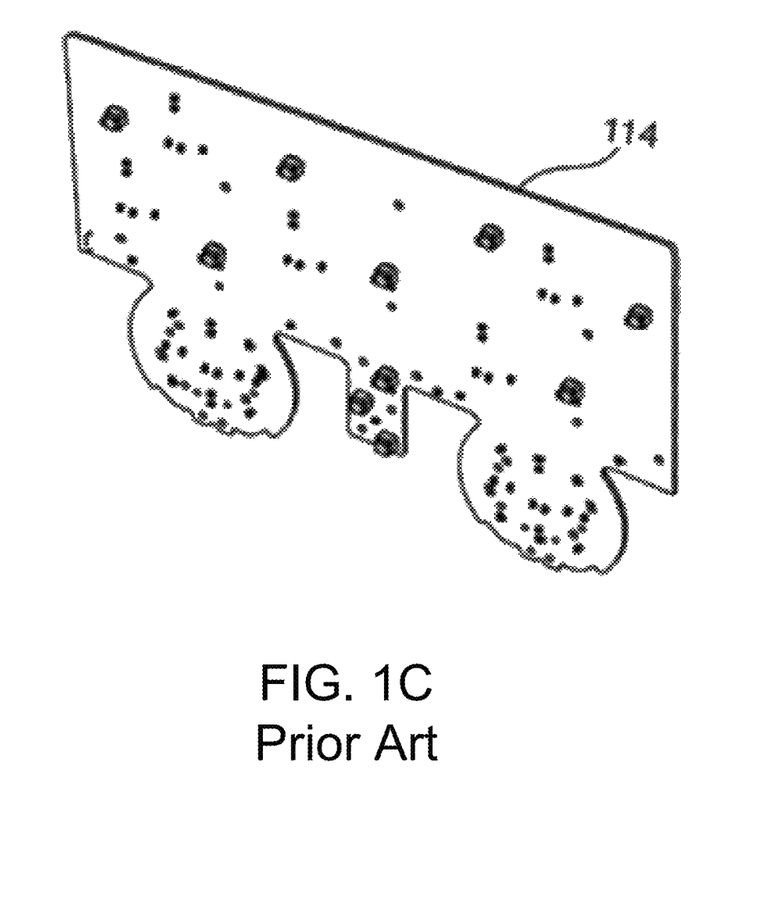
FIG. 1C shows an elevational view of a conventional, full-profile, OEM circuit board.

FIG. 1C shows an elevational view of a conventional OEM circuit board 114. Circuit board 114 includes a full-size front-on profile.

Figure 2:
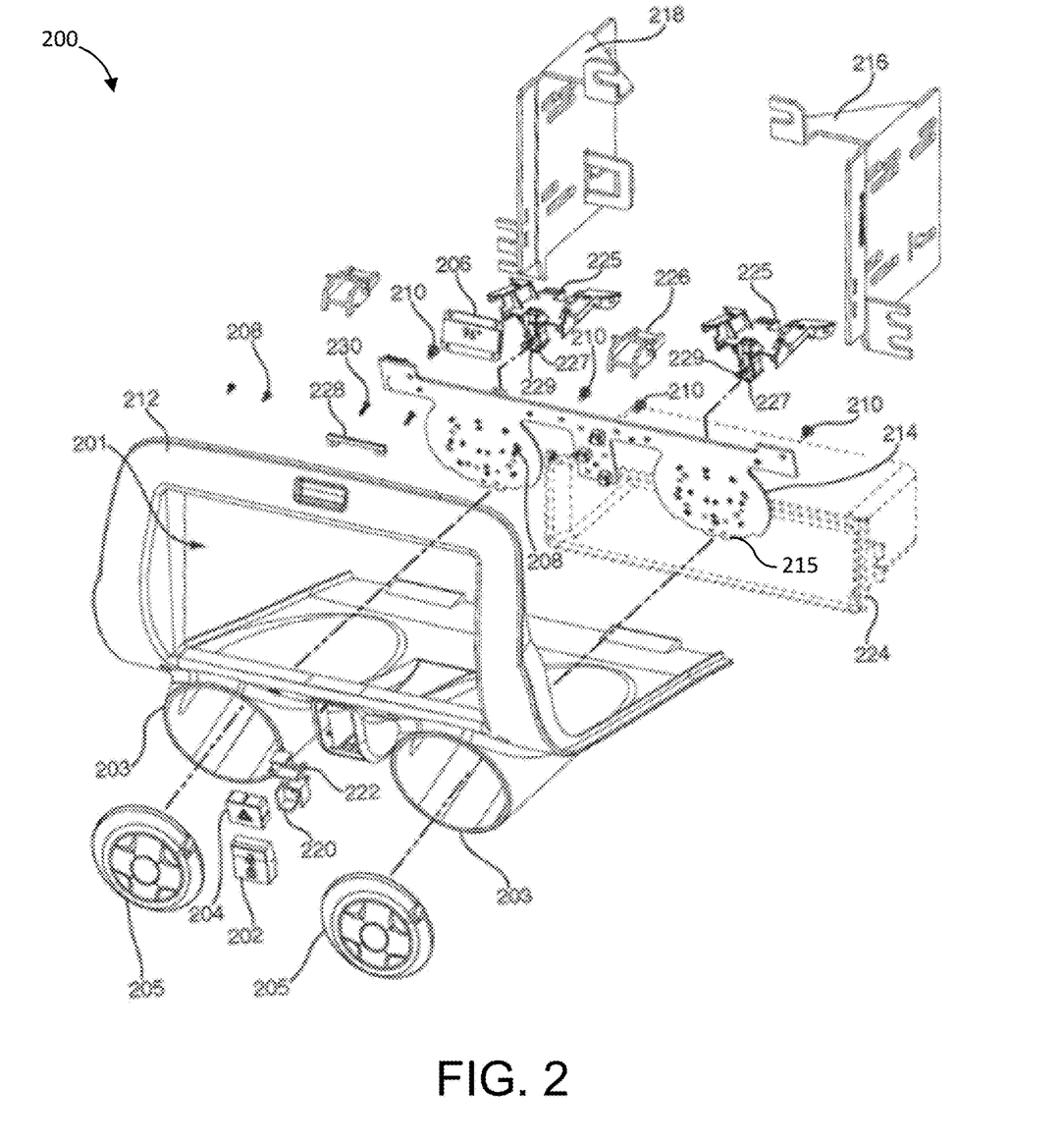
FIG. 2 shows an exploded view of a partial automotive head unit kit according to certain embodiments.

FIG. 2 shows an exploded view of a partial automotive head unit kit according to certain embodiments. FIG. 2 includes an installation kit 200 according to certain embodiments. Installation kit 200 may preferably enable installation of an aftermarket head unit in the location previously occupied by an OEM head unit. As is known in the art, installation kit 200 is preferably designed to make up for any volume and/or size mismatches between the volume occupied by the OEM head unit and the volume occupied by the aftermarket head unit.

Kit 200 preferably includes a button 202 and a hazard light button 204. It should be noted that door lock/unlock button 202 and hazard light button 204 are preferably provided in kit 200 because, in the OEM system, a door lock/unlock button and a hazard light button are preferably mounted in the console associated with the OEM head unit. As such, the functionality associated with the OEM door lock/unlock button and the OEM hazard light button may preferably be replicated in kit 200 in order to preserve the functionality associated with the OEM door lock/unlock button and OEM hazard light button. Such functionality may preferably be associated with lock/unlock button 202 and hazard light button 204. Lock/unlock button 202 and hazard light button 204 may be mounted preferably in a center portion of printed circuit board 214.

It should be noted that while kit 200 is shown to replicate the door lock/unlock button and the hazard light button functionality, it should be understood that kit 200 may also be used to support various other or additional functionality associated with the portion of the console associated with the OEM head unit, such as electronic window buttons, etc., or any other functionality, without departing from the scope of the invention.

LCD display 206 may preferably be used to show a temperature reading, a clock reading or other similar type of reading from the vehicle.

Screws 208 and 210 may be used for securing printed circuit board 214 to panel 212. It should be noted that printed circuit board 214 may preferably replicate the operation of OEM circuit board 114 that is associated with the OEM knob assemblies (see FIG. 1, element 114 and element 102). It should be noted that circuit board 214 has a reduced-front-on-profile in comparison with the conventional circuit board 114 shown in FIG. 1C.

It should be noted that in some kits, printed circuit board 214 may preferably incorporate an irregular shape 215 at the bottom of circuit board 214. Irregular shape 215 preferably provides a pass-through for a portion of detent retainer 225. Detent retainer 225, which, in certain embodiments, may preferably be salvaged from the OEM head unit, provides a spring-loaded male member 229. Spring-loaded male member 229 preferably is mounted on male member support structure 227.

Male member 229 is configured to engage, typically one at a time when a knob is turned, a series of detents (not shown) on the back of OEM knob 205. By engaging the detents on OEM knob 205 as knob 205 is turned, male member 229 preferably creates a clicking as the detent springs in and out of the detents on the back of the knob. In other words, the OEM knob rides on male member 229. Male member 229 moves up and down on the detents of the knob as the knob rotates.

Left bracket 216 and right bracket 218, upon installation of kit 200, may preferably lock kit 200 to side walls of the cavity (not shown) in the vehicle dashboard previously occupied by the OEM head unit. Subdash clips 226 preferably couple the top portion of kit 200 to the lip of the cavity left in the automobile by removal of the OEM head unit.

Lock/unlock button 202 for and hazard light button 204 may preferably engage lock membrane 220 and hazard membrane 222, respectively, when mounted in panel 212.

Kit 200 includes a large roughly rectangular aperture 201 in panel 212. This aperture is for mounting a screen of an aftermarket head unit. Such a screen may provide navigation functionality when the aftermarket head unit supports such functionality. In addition, or in the alternative, such a screen, when implemented as a touch screen, may preferably support stereo functionality such as pre-set radio station tuner knobs or any other suitable functionality associated with a touch screen. The reduced profile circuit board 214 enables the installation of a larger than OEM head unit—e.g., a double DIN head unit. This is because the height of the OEM circuit board has been reduced in order to accommodate a larger than OEM size head unit Kit 200 may also preferably include two substantially circular apertures 203 in the front face of panel 212. Circular apertures 203 preferably are configured to receive and engage OEM knob assemblies 205 in such a way as to enable OEM knob assemblies 205 to electronically couple to circuit board 214. As such, the functionality associated with OEM knob assemblies 205 may preferably be maintained following installation of kit 200.

Kit 200 may also include optional pocket 224. The size of pocket shown in FIG. 2 is what is known in the art as a single DIN size. When the aftermarket head unit that is replacing the OEM head unit is a single DIN size, then the aftermarket head unit only occupies approximately the top half of the rectangular aperture shown in the front of kit 200. Accordingly, the bottom half of rectangular aperture 201 shown in the front face of kit 200 is not occupied. Optional pocket 224 may preferably be inserted into the other half of rectangular aperture 201 not occupied by the aftermarket head unit. Optional pocket is shown by itself as pocket 402 in FIG. 4.

PCB leveler 228 may be used to level display 206 and may be affixed in place by screws 230.

Figures 3A, 3B:
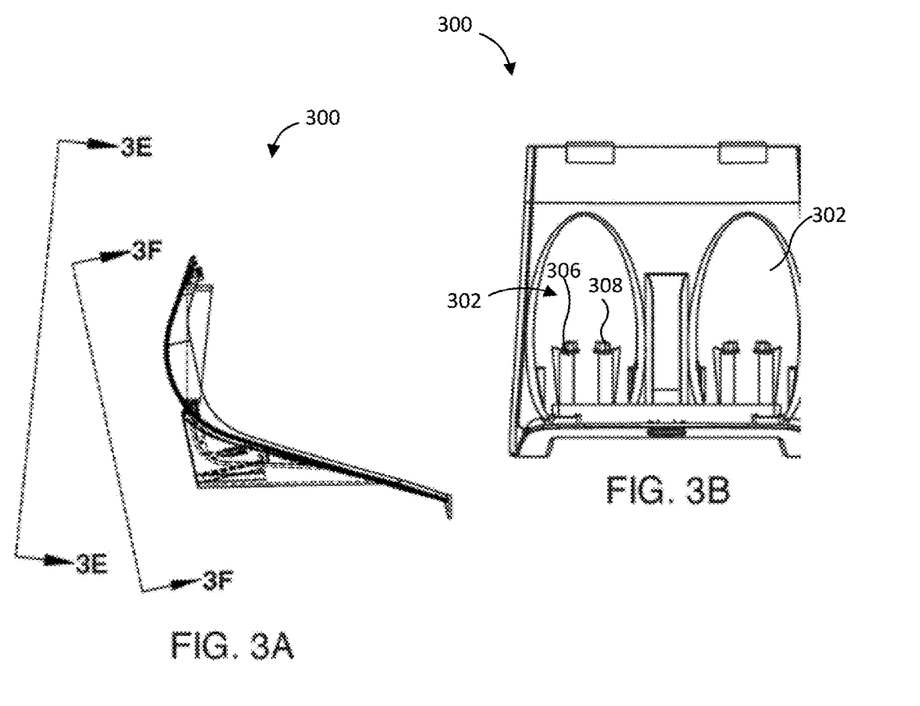
FIGS. 3A-3F shows several views of an illustrative panel according to certain embodiments.
Figure 3C:
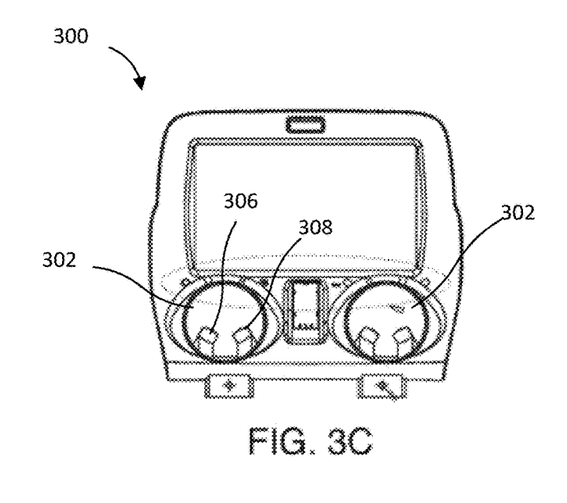
Figure 3D:
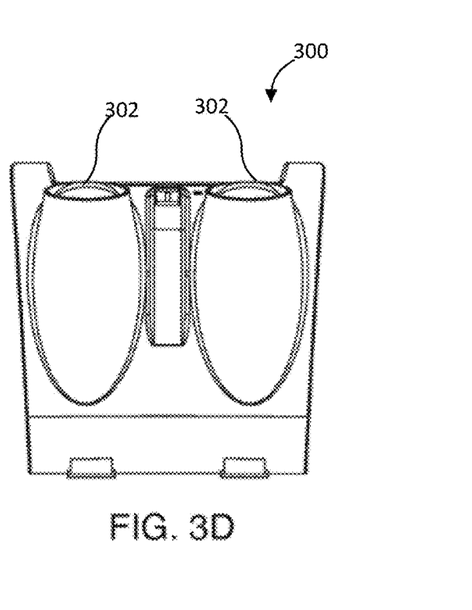
Figure 3E:
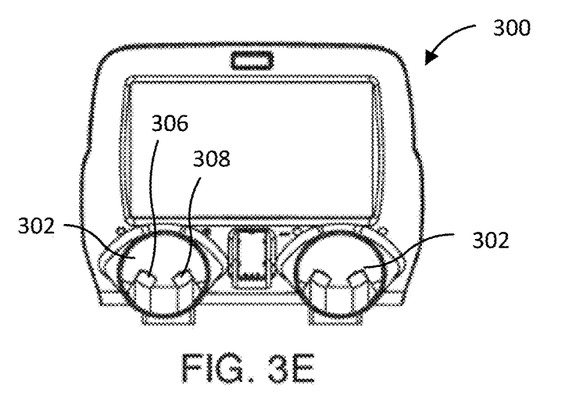
Figure 3F:
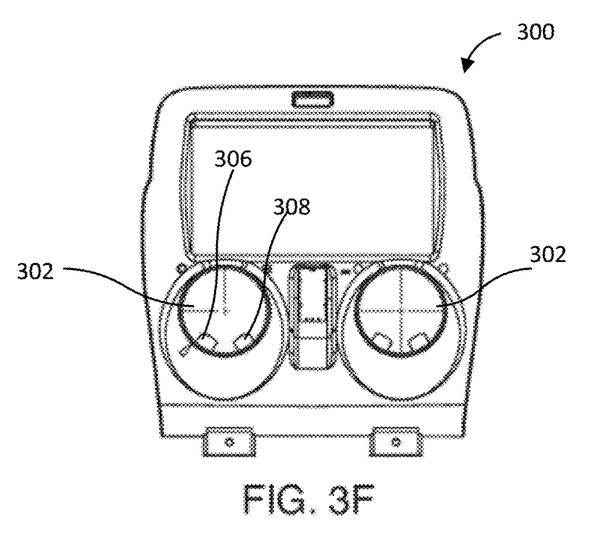

FIG. 3A-3F shows various views of illustrative panel 300 for use according to certain embodiments. FIG. 3A shows a side view, taken from a first angle, of illustrative panel 300 according to certain embodiments. FIG. 3B shows a top view of the illustrative panel 300 according to certain embodiments. FIG. 3C shows a front view of panel 300 according to certain embodiments. FIG. 3D shows a bottom view of panel 300 according to certain embodiments. FIG. 3E shows a front view, taken from a second angle of panel 300 (shown in FIG. 3A), according to certain embodiments. FIG. 3F shows a front view, taken from a third angle (shown in FIG. 3A), of panel 300 according to certain embodiments.

It should be noted that the twin circular apertures 302 on the front of panel 300 are configured to accept the knob assemblies (see FIG. 1B, element 102) from the OEM head unit. As each of twin apertures 302 preferably have a diameter of about 2.4", or other suitable size, in order to accept the legacy OEM knob assemblies following removal of the knob assemblies (see FIG. 1B, element 102) from the OEM head unit.

Furthermore, panel 300 may include two or more plastic towers 306 and 308 (shown only in FIGS. 3B and 3C for simplicity) which are adapted to engage detent retainers 225 (shown in FIG. 2) Detent retainers 225 provides a spring-loaded member such that turning the knob, each of the knobs that includes detents about the perimeter of the knob, momentarily clicks the spring-loaded mechanism. This clicking type of turning is place of providing a smooth turn. A clicking mechanism, which preferably allows the knobs to rotate in a stepwise fashion instead of a smooth turn, is more commonly found in automobiles and other moving vehicles in order to prevent accidental rotation of the knobs.

Figure 4:
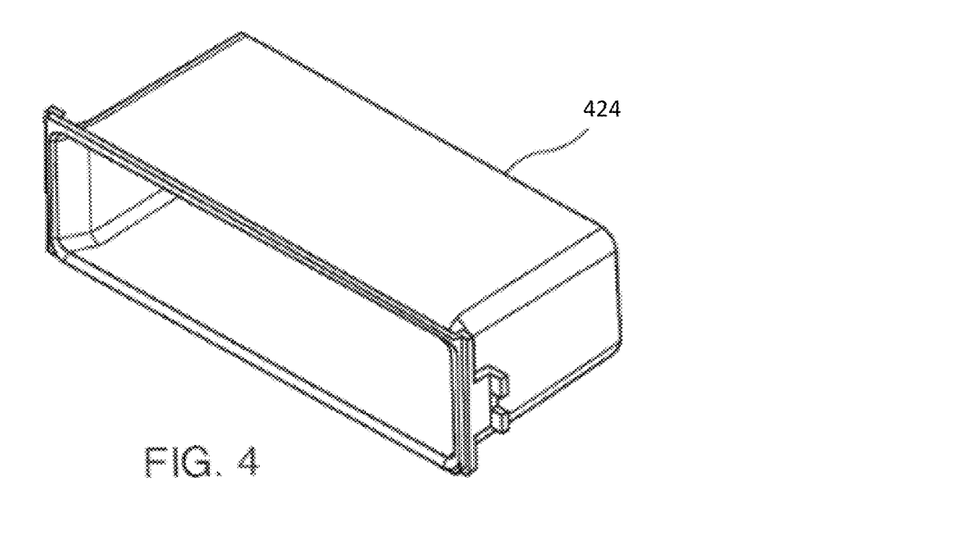
FIG. 4 shows an illustrative optional head unit pocket according to certain embodiments.

FIG. 4 shows an illustrative optional head unit pocket 424 for use according to certain embodiments. As mentioned above, optional head unit pocket 424 may preferably be used when the aftermarket head unit being installed is a single DIN head unit. However, when the aftermarket head unit being installed is a double DIN head unit (which occupies roughly twice the vertical height of a single DIN head unit), then the optional head unit pocket 424 cannot be used because the entire aperture on the front face of installation kit 200 (shown in FIG. 2) is occupied by the double DIN aftermarket head unit. It should be noted that the front face of the double DIN aftermarket head unit may be implemented as a screen that is capable of displaying a navigation map as well as any other suitable features supported by the double DIN head unit.

Figure 5:
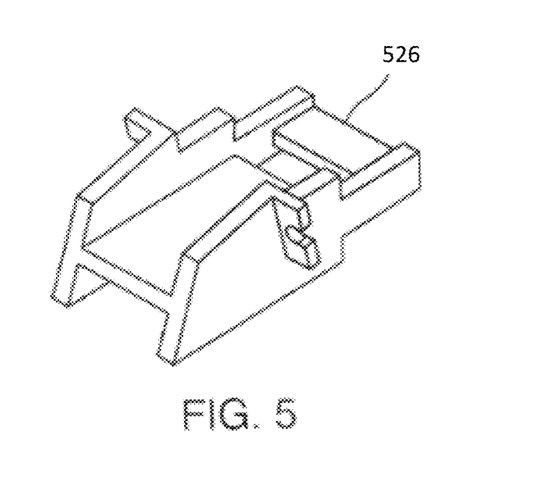
FIG. 5 shows an illustrative subdash clip according to certain embodiments.

FIG. 5 shows an illustrative subdash clips 526 for use according to certain embodiments. Subdash clips 526 may preferably be used to couple the top portion of kit 200 to the lip of the cavity left in the automobile by removal of the OEM head unit.

Figure 6:
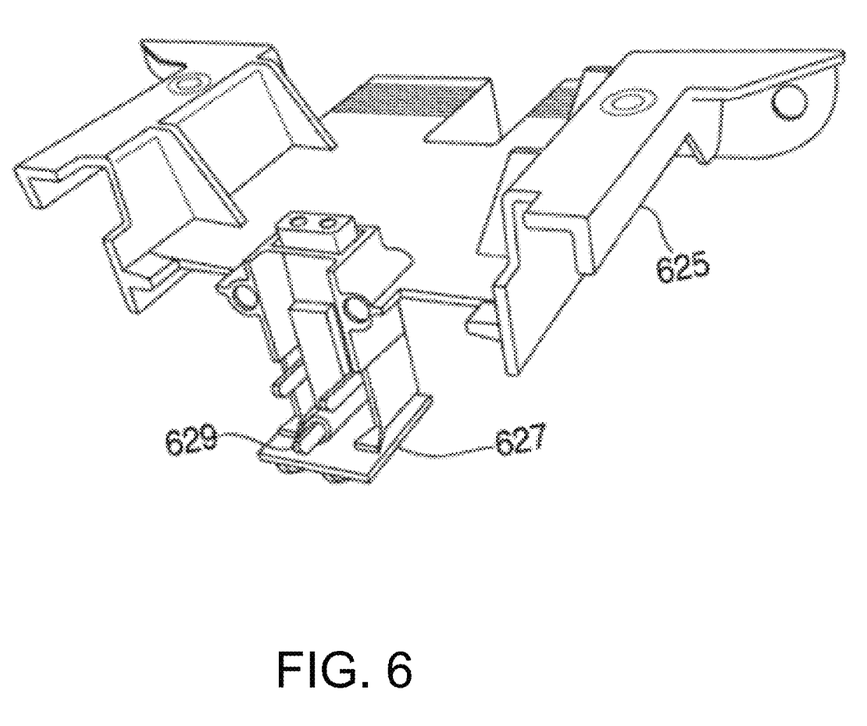
FIG. 6 shows an illustrative OEM knob detent retainer according to certain embodiments.

FIG. 6 shows an illustrative OEM knob detent retainer 625 according to certain embodiments. Such a detent retainer 625 may preferably be salvaged from the OEM head unit and placed on installation kit 200, much the same way as OEM knob assemblies 205 may preferably be salvaged from the OEM head unit and placed on installation kit 200. OEM knob detent retainer 625 preferably includes detent retainer support structure 627 and spring-loaded male member 629 (spring not shown). As discussed above, male member 629 preferably engages detents on the back of knob 205 as the knob 205 is turned, thereby creating clicking sounds—and preventing the knob from spinning unintentionally.

One of ordinary skill in the art will appreciate that the elements and steps shown and described herein may be utilized and/or performed in other than the recited system and/or order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing an aftermarket head unit installation kit for use with salvaged original equipment manufacturer (OEM) vehicle controls have been provided. Persons skilled in the art will appreciate that the present invention can be practiced by other than the described embodiments, which are presented for purposes of illustration rather than of limitation. The present invention is limited only by the claims that follow.

Although the invention has been described in detail with reference to certain preferred embodiments, variations and modifications exist within the scope and spirit of one or more independent aspects of the invention as described.

What is claimed is:

1. A method of installing a replacement head unit in a vehicle, the method comprising:
   removing an original head unit from the vehicle, the original head unit including an original circuit board;
   removing a plurality of original knob assemblies from the removed original head unit;
   installing in the vehicle the replacement head unit, wherein the replacement head unit includes a panel having a plurality of apertures for receiving and engaging the plurality of original knob assemblies, wherein installing the replacement head unit includes installing a replacement circuit board configured to replicate the functionality of the original circuit board;

installing each of the plurality of original knob assemblies in an individual one of the plurality of apertures of the replacement head unit; and operatively coupling the plurality of original knob assemblies directly to the replacement circuit board to enable the replacement circuit board to receive an input from one of the plurality of original knob assemblies upon actuation of the one of the plurality of original knob assemblies.

2. The method of claim 1, wherein the replacement circuit board receives the input in response to rotation of at least one of the original knob assemblies, and wherein, in response to the input, the replacement circuit board is configured to send signals to the vehicle via at least one from the group consisting of a data bus, a hardwired connection, and a wireless connection.

3. The method of claim 1, wherein the removed original head unit includes an original display, and wherein installing the replacement head unit further includes installing a replacement display unit, the replacement display unit being a single DIN size, and wherein the method further includes installing a pocket configured to occupy additional space not occupied by the replacement display unit.

4. The method of claim 1, further comprising removing a plurality of detent retainers from the original head unit; and installing each of the plurality of detent retainers in the replacement head unit, wherein the replacement head unit includes a plurality of detent retainer seats for receiving and engaging the plurality of detent retainers.

5. The method of claim 1, wherein the replacement circuit board includes a front-on profile that is less than a front-on profile of the original circuit board.

6. The method of claim 2, wherein the removed original head unit includes an original display, and wherein installing the replacement head unit further includes installing a replacement display unit, the replacement display unit being larger than the original display unit, and wherein the replacement circuit board is sized and shaped to accommodate the larger replacement display unit.

7. The method of claim 6, wherein the original display is a single DIN size and the replacement display unit is a double DIN size.

8. A method of installing a replacement head unit in a vehicle any time after removal of an original head unit in the vehicle, the original head unit including a plurality of original knob assemblies and an original circuit board configured to receive signals from the original knob assemblies, the method comprising:

installing a panel within the vehicle, the panel including a plurality of apertures, each of the plurality of apertures configured to receive one of the plurality of original knob assemblies;

installing a replacement circuit board within the vehicle, the replacement circuit board configured to replicate functionality of the original circuit board;

installing the plurality of original knob assemblies within the plurality of apertures of the panel;

operatively coupling the plurality of original knob assemblies directly to the replacement circuit board to enable the replacement circuit board to receive an input from one of the plurality of original knob assemblies upon actuation of the one of the plurality of original knob assemblies; and installing a replacement display unit within the panel.

9. The method of claim 8, wherein the replacement display is a single DIN size, and wherein the method further includes installing a pocket configured to occupy additional space not occupied by the replacement display unit.

10. The method of claim 8, wherein the replacement circuit board receives the input in response to rotation of at least one of the original knob assemblies.

11. The method of claim 8, wherein installing the plurality of original knob assemblies within the panel includes installing a plurality of detent members configured to rotatably engage the original knob assemblies within the apertures of the panel.

12. The method of claim 11, wherein the plurality of detent members include a plurality of detent retainers removed from the original head unit and a plurality of detent seats configured to receive and engage the plurality of detent retainers within the replacement head unit.

13. The method of claim 8, wherein the replacement circuit board includes a front-on profile that is less than a front-on profile of the original circuit board.

14. The method of claim 8, wherein the replacement display unit is larger than an original display unit, and wherein the replacement circuit board is sized and shaped to accommodate the larger replacement display unit.

15. The method of claim 14, wherein the original display is a single DIN size and the replacement display unit is a double DIN size.

16. A method of installing a replacement head unit in a vehicle any time after removal of an original head unit in the vehicle, the original head unit including a plurality of original knob assemblies, an original circuit board configured to receive signals from the original knob assemblies, and an original display, the method comprising:

installing a panel within the vehicle, the panel including a plurality of circular apertures and a rectangular aperture, each of the plurality of circular apertures configured to receive one of the plurality of original knob assemblies;

installing a replacement circuit board within the vehicle, the replacement circuit board configured to replicate functionality of the original circuit board;

installing the plurality of original knob assemblies within the plurality of circular apertures of the panel;

operatively coupling the plurality of original knob assemblies directly to the replacement circuit board to enable the replacement circuit board to receive an input from one of the plurality of original knob assemblies upon actuation of the one of the plurality of original knob assemblies;

configuring the replacement circuit board to send signals from the plurality of original knob assemblies to the vehicle via at least one from the group consisting of a data bus, a hardwired connection, and a wireless connection; and installing a replacement display unit within the rectangular aperture of the panel.

17. The method of claim 16, wherein the replacement circuit board has a front-on profile that is less than 60% of a front-on profile of the original circuit board.

18. The method of claim 17, wherein the replacement display unit is a double DIN size and the original display unit is a single DIN size.

* * * * *